(12) United States Patent
Seo et al.

(10) Patent No.: US 10,775,742 B2
(45) Date of Patent: Sep. 15, 2020

(54) METHOD AND APPARATUS FOR PROCESSING HOLOGRAPHIC IMAGE

(71) Applicant: SAMSUNG ELECTRONICS CO., LTD., Suwon-si (KR)

(72) Inventors: Juwon Seo, Osan-si (KR); Wontaek Seo, Yongin-si (KR); Hoon Song, Yongin-si (KR); Jungkwuen An, Cheonan-si (KR); Hongseok Lee, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 428 days.

(21) Appl. No.: 15/271,351

(22) Filed: Sep. 21, 2016

(65) Prior Publication Data

US 2017/0235277 A1  Aug. 17, 2017

(30) Foreign Application Priority Data

Feb. 12, 2016  (KR) .................. 10-2016-0016355

(51) Int. Cl.
*G03H 1/08* (2006.01)
*G03H 1/26* (2006.01)
(Continued)

(52) U.S. Cl.
CPC .............. *G03H 1/268* (2013.01); *G03H 1/08* (2013.01); *G03H 1/22* (2013.01); *G03H 1/2202* (2013.01);
(Continued)

(58) Field of Classification Search
CPC ............ G03H 1/268; G03H 1/08; G03H 1/22; G03H 1/2202; G03H 1/2294; G03H 1/26;
(Continued)

(56) References Cited

U.S. PATENT DOCUMENTS 8,441,703 B2   5/2013  Leister
9,154,766 B2  10/2015  Kim et al.
(Continued)

FOREIGN PATENT DOCUMENTS

CN         1489753 A   4/2004
CN       101014911 A   8/2007
(Continued)

OTHER PUBLICATIONS

Tajaheurce et al (Encrypting three-dimensional information with digital holography, Applied Optics, Dec. 10, 2000, vol. 39, No. 35, pp. 6595-6601).*

(Continued)

*Primary Examiner* — Jade R Chwasz
*Assistant Examiner* — Jyotsna V Dabbi
(74) *Attorney, Agent, or Firm* — Sughrue Mion, PLLC

(57) ABSTRACT

An apparatus and method for processing a holographic image. The apparatus calculates a first calculation result with respect to an image for the left eye and a first calculation result with respect to an image for the right eye and stores the results at different memory addresses of a storage. Thereafter, the apparatus calculates values of a waveform of light to be modulated by a spatial light modulator by performing a second calculation that uses all of the first calculation results stored in the storage. An image window of the image for the left eye and an image window of the image for the right eye are spatially separated from each other by the apparatus in a viewing window of a hologram image reproduced via the spatial light modulator.

26 Claims, 15 Drawing Sheets

(51) Int. Cl.
  *G03H 1/22* (2006.01)
  *G06K 9/00* (2006.01)
  *G06F 3/01* (2006.01)

(52) U.S. Cl.
  CPC ............ *G03H 1/2294* (2013.01); *G06F 3/013* (2013.01); *G06K 9/0061* (2013.01); *G03H 2001/2234* (2013.01); *G03H 2001/2242* (2013.01); *G03H 2225/60* (2013.01); *G03H 2226/02* (2013.01); *G03H 2226/05* (2013.01); *G03H 2270/55* (2013.01)

(58) Field of Classification Search
  CPC ......... G03H 2001/2234; G03H 1/2242; G03H 1/60; G03H 1/02; G03H 1/05; G03H 2001/55; G03H 2225/60; G03H 2226/02; G03H 2226/05; G03H 2270/55; G06K 9/00; G06K 9/0061; G06F 3/01; G06F 3/013
  USPC ............................................................ 359/9
  See application file for complete search history.

(56) References Cited

U.S. PATENT DOCUMENTS

| | | | |
|---|---|---|---|
| 2002/0085000 A1 | 7/2002 | Sullivan et al. | |
| 2004/0021768 A1* | 2/2004 | Payne | G02B 27/225 348/51 |
| 2006/0050340 A1 | 3/2006 | Schwerdtner et al. | |
| 2006/0139711 A1 | 6/2006 | Leister et al. | |
| 2007/0024999 A1* | 2/2007 | Crossland | G03H 1/2294 359/859 |
| 2010/0067075 A1 | 3/2010 | Schwerdtner | |
| 2010/0149609 A1 | 6/2010 | Schwerdtner | |
| 2010/0157399 A1* | 6/2010 | Kroll | G03H 1/02 359/11 |
| 2011/0149018 A1* | 6/2011 | Kroll | G03H 1/02 348/40 |
| 2011/0280316 A1 | 11/2011 | Chen et al. | |
| 2013/0044102 A1* | 2/2013 | Kim | G09G 3/003 345/419 |
| 2017/0038728 A1 | 2/2017 | Zschau et al. | |

FOREIGN PATENT DOCUMENTS

| | | |
|---|---|---|
| CN | 101689037 A | 3/2010 |
| CN | 102918466 A | 2/2013 |
| KR | 10-2013-0019273 A | 2/2013 |
| KR | 10-2013-0061503 A | 6/2013 |
| WO | 2011121130 A2 | 10/2011 |

OTHER PUBLICATIONS

Communication dated Mar. 22, 2017, issued by the European Patent Office in counterpart European Application No. 17150447.5.
Communication dated Jan. 10, 2020, issued by the State Intellectual Property Office of P.R. China in counterpart Chinese Application No. 201710066103.1.

* cited by examiner

METHOD AND APPARATUS FOR PROCESSING HOLOGRAPHIC IMAGE

CROSS-REFERENCE TO RELATED APPLICATION

This application claims priority from Korean Patent Application No. 10-2016-0016355, filed on Feb. 12, 2016, in the Korean Intellectual Property Office, the disclosure of which is incorporated herein by reference in its entirety.

BACKGROUND

1. Field

Exemplary embodiments relate to methods and apparatuses for processing a holographic image, and more particularly, to methods and apparatuses for processing a computer-generated hologram (CGH) image.

2. Description of the Related Art

A glass method and a glassless method have been widely used for generating three-dimensional (3D) images. The glass method includes a polarizing glass method and a shutter glass method, and the glassless method includes a lenticular method and a parallax barrier method. All of these methods are based on the binocular parallax of the human visual system, and thus, an increase in the number of points of view is limited and a perceptional depth recognized by the brain does not match a focal point of the two eyes. Thus, these methods typically cause an observer to feel tired.

A holographic display method has been recently used as a 3D image display method that is capable of generating a perceptional depth recognized by the brain, without matching a focal point of two eyes, and providing full parallax. In holographic display method, an image of an original object is reproduced by emitting reference light toward a hologram pattern that includes an interference pattern obtained by causing object light reflected from the original object to interfere with the reference light such that the reference light is diffracted. In currently used holographic display methods, a computer-generated hologram (CGH) is provided to a spatial light modulator as an electrical signal rather than obtaining a hologram pattern by directly exposing an original object to light. In this case, the spatial light modulator may form a hologram pattern and diffract reference light according to an input CGH signal, thereby generating a 3D image.

SUMMARY

Provided are methods and apparatuses for processing a holographic image.

Additional aspects will be set forth in part in the description which follows and, in part, will be apparent from the description, or may be learned by practice of the presented exemplary embodiments.

According to an aspect of an exemplary embodiment, an apparatus for processing a holographic image includes: a first calculator configured to calculate values of a light waveform for the left pupil and values of a light waveform for the right pupil by performing a first calculation on an image for the left eye and an image for the right eye that are included in input image data; a storage configured to store the calculated values of the light waveform for the left pupil at a first memory address and to store the calculated values of the light waveform for the right pupil at a second memory address; and a second calculator configured to calculate values of a waveform of light to be modulated by a spatial light modulator by performing a second calculation that uses the calculation results stored at the first and second memory addresses such that an image window of the image for the left eye and an image window of the image for the right eye are spatially separated from each other within a viewing window.

The second calculator may be further configured to perform the second calculation that uses the calculation results stored at the first and second memory addresses in a single operation.

The apparatus may further include a scaler configured to change each of a first resolution of the image for the left eye and a second resolution of the image for the right eye.

The scaler may be further configured to change the respective resolutions based on a size of the image window of the image for the left eye and a size of the image window of the image for the right eye.

Each of the size of the image window of the image for the left eye and the size of the image window of the image for the right eye may be less than or equal to ¼ a size of the viewing window.

Each of size of the image window of the image for the left eye and the size of the image window of the image for the right eye may be determined according to an image complexity of the input image data.

The apparatus may further include a pupil measurer configured to measure a size of at least one of the left pupil and the right pupil, wherein each of the size of the image window of the image for the left eye and the size of the image window of the image for the right eye is determined according to the respective pupil's size measured by the pupil measurer.

The scaler may be further configured to variably adjust the respective resolutions of the image for the left eye and the image for the right eye according to respective depths of the image for the left eye and the image for the right eye.

The apparatus may further include an image extractor configured to extract each of the image for the left eye and the image for the right eye from the input image data.

The image extractor may be further configured to adjust the respective resolutions of the image for the left eye and the image for the right eye based on the size of the image window of the image for the left eye and the size of the image window of the image for the right eye.

Each of the size of the image window of the image for the left eye and the size of the image window of the image for the right eye may be less than or equal to ¼ a size of the viewing window.

Each of the size of the image window of the image for the left eye and the size of the image window of the image for the right eye may be determined according to an image complexity of the input image data.

The apparatus may further include a pupil measurer configured to measure a size of at least one of the left pupil and the right pupil, wherein each of the size of the image window of the image for the left eye and the size of the image window of the image for the right eye is determined according to the respective pupil's size measured by the pupil measurer.

The image extractor may be further configured to variably adjust the respective resolutions of the image for the left eye and the image for the right eye according to respective depths of the image for the left eye and the image for the right eye.

The second calculator may be further configured to perform the second calculation such that each of the image window of the image for the left eye and the image window of the image for the right eye is spatially separated from a display region of a noise image.

The noise image may include a lattice spot noise image and one or more complex conjugate noise images of each of the image for the left eye and the image for the right eye.

According to an aspect of another exemplary embodiment, a method for processing a holographic image includes: calculating values of a light waveform for the left pupil and values of a light waveform for the right pupil by performing a first calculation on an image for the left eye and an image for the right eye that are included in input image data; storing the calculated values of the light waveform for the left pupil at a first memory address and storing the calculated values of the light waveform for the right pupil at a second memory address; and calculating values of a waveform of light to be modulated by a spatial light modulator by performing a second calculation on the uses the calculation results stored at the first and second memory addresses, wherein the calculating of the values of the waveform of light to be modulated by the spatial light modulator includes performing the second calculation such that an image window of the image for the left eye and an image window of the image for the right eye are spatially separated from each other within a viewing window.

The performing of the second calculation may include performing the second calculation that uses the calculation results stored at the first and second memory addresses in a single operation.

The method may further include adjusting each of a first resolution of the image for the left eye and a second resolution of the image for the right eye.

The adjusting of the resolutions may include changing the respective resolutions based on a size of the image window of the image for the left eye and a size of the image window of the image for the right eye.

Each of the size of the image window of the image for the left eye and the size of the image window of the image for the right eye may be less than or equal to ¼ a size of the viewing window.

Each of the size of the image window of the image for the left eye and the size of the image window of the image for the right eye may be determined according to an image complexity of the input image data.

The method may further include measuring a size of at least one of the left pupil and the right pupil by using a pupil measurer, wherein each of the size of the image window of the image for the left eye and the size of the image window of the image for the right eye is determined according to the respective pupil's size measured by the pupil measurer.

The adjusting of the resolutions may include variably adjusting the respective resolutions of the image for the left eye and the image for the right eye according to respective depths of the image for the left eye and the image for the right eye.

The method may further include extracting each of the image for the left eye and the image for the right eye from the input image data.

The extracting of the image for the left eye and the image for the right eye may include adjusting the respective resolutions of the image for the left eye and the image for the right eye based on the size of the image window of the image for the left eye and the size of the image window of the image for the right eye.

Each of the size of the image window of the image for the left eye and the size of the image window of the image for the right eye may be less than or equal to ¼ a size of the viewing window.

Each of the size of the image window of the image for the left eye and the size of the image window of the image for the right eye may be determined according to an image complexity of the input image data.

The method may further include measuring a size of at least one of the left pupil and the right pupil by using a pupil measurer, wherein each of the size of the image window of the image for the left eye and the size of the image window of the image for the right eye is determined according to the respective pupil's size measured by the pupil measurer.

The extracting of each of the image for the left eye and the image for the right eye may include adjusting the respective resolutions of the image for the left eye and the image for the right eye according to respective depths of the image for the left eye and the image for the right eye.

The calculating of the values of the waveform of light to be modulated by the spatial light modulator may include performing the second calculation such that each of the image window of the image for the left eye and the image window of the image for the right eye is spatially separated from a display region of a noise image.

The noise image may include a lattice spot noise image and one or more complex conjugate noise images of each of the image for the left eye and the image for the right eye.

BRIEF DESCRIPTION OF THE DRAWINGS

These and/or other aspects will become apparent and more readily appreciated from the following description of exemplary embodiments, taken in conjunction with the accompanying drawings in which.

DETAILED DESCRIPTION

Figure 1:
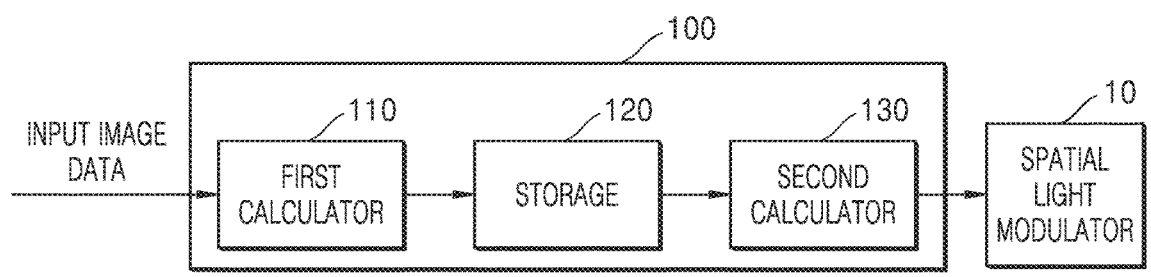
FIG. 1 illustrates a block diagram of an apparatus for processing a holographic image, according to an exemplary embodiment.

The terms used in this specification are those general terms currently widely used in the art, but the terms may vary according to the intention of those of ordinary skill in the art, precedents, or new technology in the art. Also, specified terms may be selected by the applicant, and in this case, the detailed meaning thereof will be described in the detailed description. Thus, the terms used in the specification shall be understood not as simple names but based on the meaning of the terms and the overall description.

When it is described that a certain element is 'connected' to another element, it shall be understood that the certain element may be directly connected to another element or electrically connected to another element via another element in the middle (i.e., in between the two elements). Throughout the specification, it will also be understood that when a component "includes" an element, unless there is another opposite description thereto, it shall be understood that the component does not exclude another element but may further include another element. In addition, terms such as " . . . unit", " . . . module", or the like refer to units that perform at least one function or operation, and the units may be implemented as any of hardware or software or as a combination of hardware and software.

It shall be understood that the term such as 'include' or 'comprise' does not necessarily include a plurality of elements or steps described in the specification, and it shall be understood that some of the elements or steps may not be included, or additional elements or steps may be further included.

Although terms, such as 'first' and 'second', can be used to describe various elements, the elements cannot be limited by the terms. The terms can be used to distinguish a certain element from another element.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

FIG. 1 illustrates a block diagram of an apparatus 100 for processing a holographic image, according to an exemplary embodiment.

Referring to FIG. 1, the apparatus 100 may include a first calculator 110, a storage 120 configured to store a calculation result of the first calculator 110, and a second calculator 130 configured to perform a second calculation that uses the calculation result stored in the storage 120.

The first calculator 110 may calculate values of a light waveform on a left pupil surface and values of a light waveform on a right pupil surface by performing a first calculation that relates to an image for the left eye and an image for the right eye included in input image data. The second calculator 130 may store the calculated values of the light waveform on the left pupil surface at a first memory address and also store the calculated values of the light waveform on the right pupil surface at a second memory address. In addition, the second calculator 130 may calculate values of a waveform of light to be modulated by a spatial light modulator 10 by performing the second calculation based on the calculation results stored at the first and second memory addresses. The second calculator 130 may perform the second calculation such that the image for the left eye and the image for the right eye are spatially separated from each other and displayed on a hologram image surface.

FIG. 1 shows only components related to the present exemplary embodiment to prevent features of the present exemplary embodiment from being obscured. Thus the apparatus 100 may further include general-use components in addition to the components shown in FIG. 1. The first calculator 110, the storage 120, and the second calculator 130 are identified as separate independent elements according to respective functions thereof. Therefore, the functions of the first calculator 110, the storage 120, and the second calculator 130 may be implemented by different hardware resources or by the same hardware resources. Alternatively, the first calculator 110, the storage 120, and the second calculator 130 may correspond to one or more processing modules (or sub-processors) in the apparatus 100. Alternatively, the first calculator 110, the storage 120, and the second calculator 130 may correspond to separate software algorithm units identified according to functions thereof, respectively. That is, an implementation type of the first calculator 110, the storage 120, and the second calculator 130 is not limited to any one of the cases described above.

The apparatus 100 of FIG. 1 may generate a hologram data signal from input image data and provide the generated hologram data signal to the spatial light modulator 10. The hologram data signal may include information about light to be modulated by the spatial light modulator 10 and/or information about a diffraction pattern corresponding to the light to be modulated. The spatial light modulator 10 may form a diffraction pattern based on light waveform information provided by the apparatus 100. The spatial light modulator 10 may modulate reference light incident to the diffraction pattern. The spatial light modulator 10 may display a hologram image corresponding to the input image data by modulating the reference light.

The input image data may include information about an image to be reproduced as a hologram image. The input image data may be provided in any of various ways. For example, the input image data may include a pre-captured image. As another example, the input image data may include a virtually produced image such as an animation image. The input image data is not limited to a moving picture and may include a still image.

The input image data may include information about each of an image for the left eye and an image for the right eye. Herein, the image for the left eye indicates an image recognized by the left eye of an observer, and the image for the right eye indicates an image recognized by the right eye of the observer. The image for the left eye and the image for the right eye may differ from each other because of a parallax effect, thereby causing the observer to feel a spatial effect and the like. For example, when the input image data includes a pre-captured image, the image for the left eye and the image for the right eye may be captured via a stereo scheme. In addition, when the input image data includes virtual image data such as an animation, the input image data may include image data for the left eye and image data for the right eye for each frame.

Figure 2:
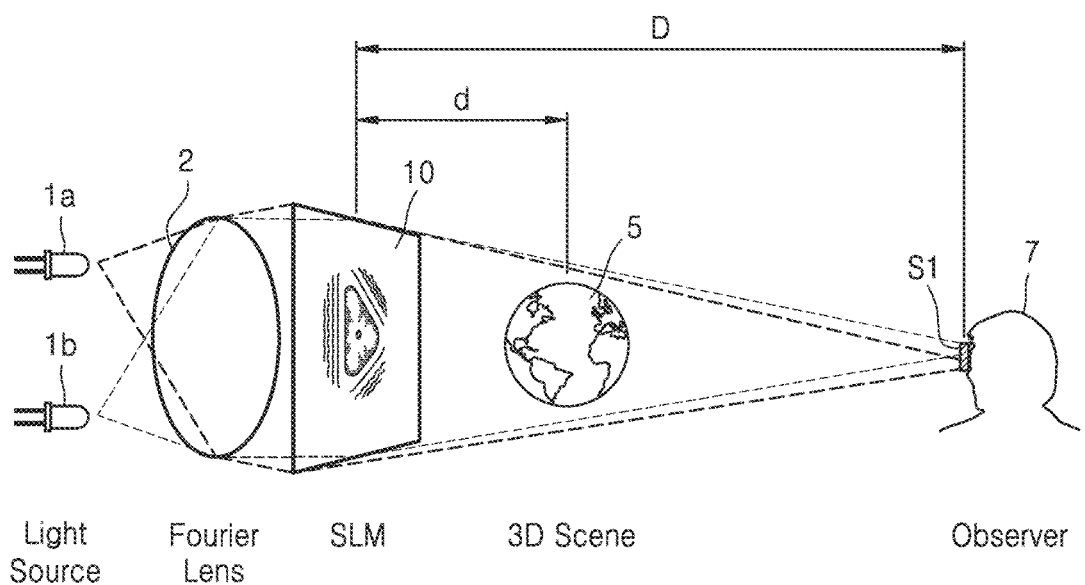
FIG. 2 illustrates an example of displaying a holographic image via the apparatus of FIG. 1 and a spatial light modulator.

FIG. 2 illustrates an example of displaying a holographic image via the apparatus 100 of FIG. 1 and the spatial light modulator 10.

The apparatus 100 may generate a hologram data signal and provide the hologram data signal to the spatial light modulator 10. The hologram data signal may include waveform information about light to be modulated by the spatial light modulator 10 such that a targeted hologram image is reproduced in a space. The spatial light modulator 10 may form a diffraction pattern on a surface of the spatial light modulator 10 according to the hologram data signal provided from the apparatus 100. The diffraction pattern may vary with respect to a waveform of light modulated by the spatial light modulator 10.

Light sources 1a and 1b may provide reference light to the spatial light modulator 10. The reference light emitted from the light sources 1a and 1b may be focused on the spatial light modulator 10 through a Fourier lens 2. An angle of view of a hologram image to be reproduced may increase by causing a convergence of the reference light via the Fourier lens 2. However, if the light sources 1a and 1b provide focused convergence light, the Fourier lens 2 may be omitted.

When the reference light is diffracted and interferes with the diffraction pattern formed by the spatial light modulator 10, a stereoscopic hologram image 5 may be reproduced in a certain space in front of the spatial light modulator 10. A distance between the space in which the reproduced hologram image 5 is located and the spatial light modulator 10 may be referred to as a depth d. Generally, a shape and the depth d of the hologram image 5 may be determined according to a hologram pattern formed by the spatial light modulator 10. When the hologram image 5 is reproduced, an observer 7 may see the hologram image 5 from a viewing position which is space apart by a distance D from the spatial light modulator 10. Herein, a surface on which the hologram image 5 is displayed at the viewing position from which the hologram image 5 is seen may be referred to as a hologram image display surface S1. The hologram image display surface S1 may be a flat surface or a curved surface. If the pupils of the observer 7 are located on the hologram image display surface S1, the observer 7 may view the hologram image 5 and perceive a spatial effect. One hologram image display surface S1 may be specified, or a plurality of hologram image display surfaces S1 may be formed. In the case of the plurality of hologram image display surfaces S1, even when the distance D between the observer 7 and the spatial light modulator 10 varies, the observer 7 may view the hologram image 5.

Hereinafter, the method used by apparatus 100 of FIG. 1 to process a holographic image is described with reference to FIG. 3A.

Figure 3A:
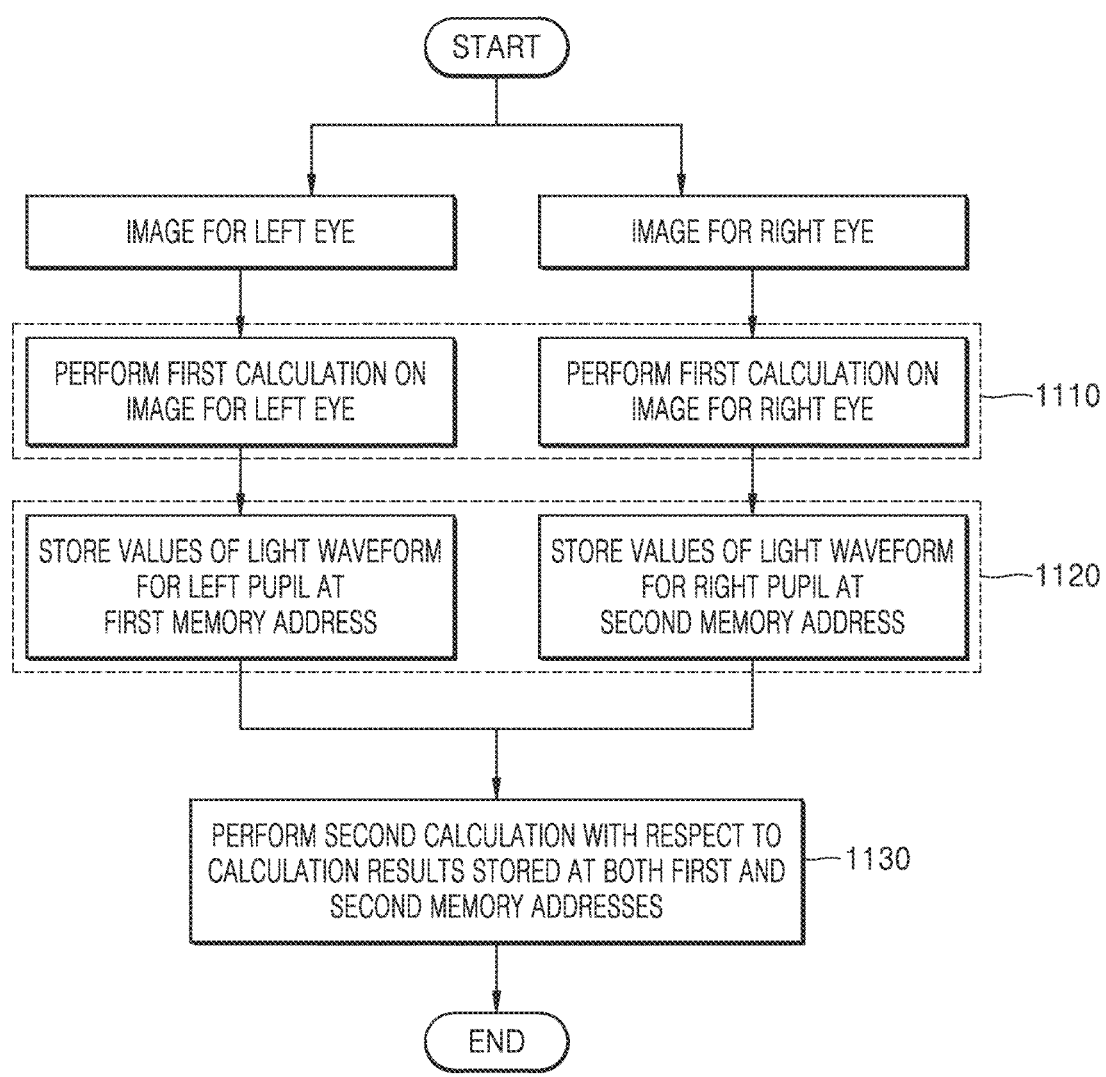
FIG. 3A illustrates a flowchart of a method used by the apparatus of FIG. 1 to process a holographic image, according to an exemplary embodiment.

FIG. 3A illustrates a flowchart of a method used by the apparatus 100 of FIG. 1 to process a holographic image, according to an exemplary embodiment.

Referring to FIG. 3A, in operation 1110, the first calculator 110 may perform the first calculation based on each of an image for the left eye and an image for the right eye. The first calculator 110 may calculate values of a light waveform for the left pupil of an observer by performing the first calculation with respect to the image for the left eye. The light waveform for the left pupil indicates a waveform which light incident to the left eye of the observer has on a left pupil surface such that the left eye of the observer recognizes the image for the left eye. The left pupil surface may be a virtual surface including the left pupil of the observer.

In addition, the first calculator 110 may calculate values of a light waveform for the right pupil of the observer by performing the first calculation with respect to the image for the right eye. The light waveform for the right pupil indicates a waveform which light incident to the right eye of the observer has on a right pupil surface such that the right eye of the observer recognizes the image for the right eye. The right pupil surface may be a virtual surface including the right pupil of the observer.

The light waveform may include information about any one or more of an amplitude, a phase, and the like of the light. In addition, information about the light waveform may be represented by a complex number. Therefore, the first calculator 110 may calculate a complex number indicating the light waveform for the left pupil and a complex number indicating the light waveform for the right pupil. The first calculation performed by the first calculator 110 indicates an operation for calculating values of a waveform of light. For example, the first calculation may be a fast Fourier transform (FFT) operation. As another example, when a 3D image is displayed with dots, the first calculation may be an operation that uses a sum of point spread functions (PSFs). As another example, when a surface of a 3D image is displayed with a plurality of polyhedrons, the first calculation may include an angular spectrum operation.

In operation 1120, the calculated values of the light waveform for the left pupil may be stored at a first memory address of the storage 120. In addition, the calculated values of the light waveform for the right pupil may be stored at a second memory address of the storage 120. That is, the values of the light waveform for the left pupil and the values of the light waveform for the right pupil, which are calculated by the first calculator 110, may be stored at different memory addresses.

The storage 120 may include any of random access memory (RAM), such as dynamic RAM (DRAM) or static RAM (SRAM), read-only memory (ROM), electrically erasable programmable ROM (EEPROM), CD-ROM, a Blu-Ray or other optical disc storage, a hard disk drive (HDD), a solid state storage (SSD), or a flash memory and may further include another external storage device accessible to a computing device.

Figure 3B:
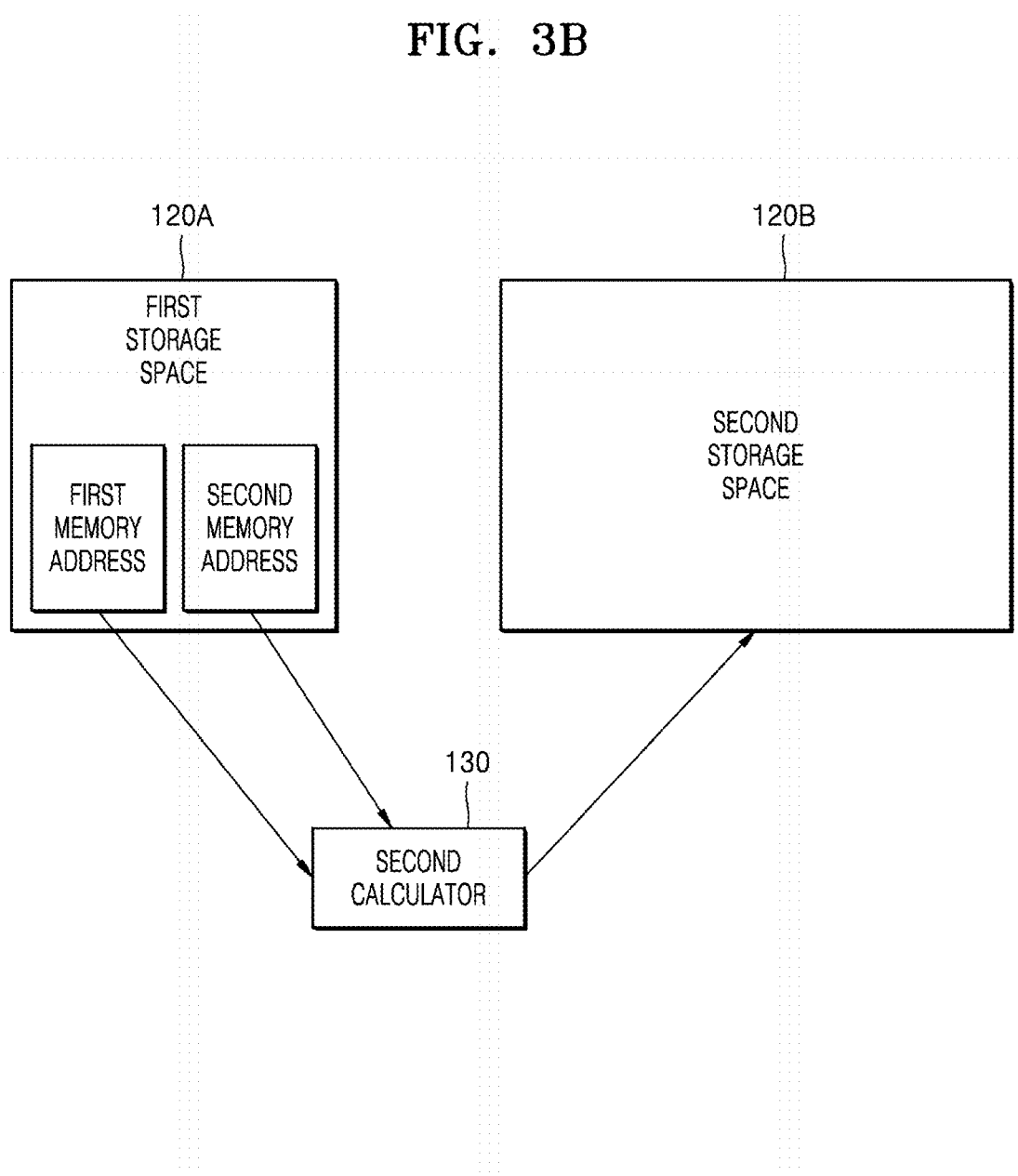
FIG. 3B illustrates a conceptual diagram of a first storage space and a second storage for respectively storing a calculation result of a first calculator and a calculation result of a second calculator.

FIG. 3B illustrates a conceptual diagram of a first storage space 120A and a second storage 120B for respectively storing a calculation result of the first calculator 110 and a calculation result of the second calculator 130.

The first and second storage spaces 120A and 120B shown in FIG. 3B may be spaces of the storage 120 in which data is stored. Referring to FIG. 3B, the first calculator 110 may store a first calculation result with respect to the image for the left eye and a first calculation result with respect to the image for the right eye at different memory addresses. For example, the first calculator 110 may store the first calculation result with respect to the image for the left eye at the first memory address of the first storage space 120A and store the first calculation result with respect to the image for the right eye at the second memory address of the first storage space 120A.

The second calculator 130 may read the first calculation results stored at the first storage space 120A. The second calculator 130 may read the first calculation results while scanning memory addresses of the first storage space 120A. For example, the second calculator 130 may load the first calculation result stored at the first memory address and perform the second calculation on the image for the left eye. In addition, the second calculator 130 may load the first calculation result stored at the second memory address and perform the second calculation on the image for the right eye. An operation in which the second calculator 130 loads the first calculation results stored at the first and second memory addresses may not be temporally segmented but be performed in one single operation.

A second calculation result of the second calculator 130 may be stored at the second storage space 120B. In addition, the size of second storage space 120B may be greater than the size of the first storage space 120A. In addition, a data size of the second calculation result of the second calculator 130 may be greater than a data size of the first calculation results of the first calculator 110.

Figure 4:
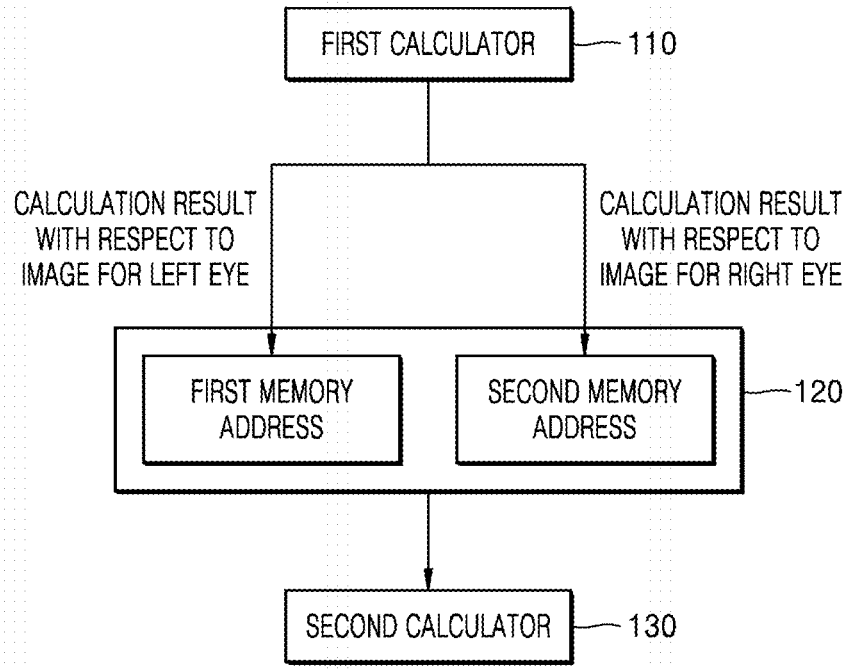
FIG. 4 illustrates a conceptual diagram for describing storing of values of a light waveform for the left pupil and values of a light waveform for the right pupil in a storage.

FIG. 4 illustrates a conceptual diagram for describing storing of values of a light waveform for the left pupil and values of a light waveform for the right pupil in the storage 120.

Referring to FIG. 4, a result of the first calculation on the image for the left eye by the first calculator 110 may be stored at the first memory address of the storage 120, and a result of the first calculation on the image for the right eye by the first calculator 110 may be stored at the second memory address of the storage 120. The contents stored at the first and second memory addresses of the storage 120 may be transmitted to the second calculator 130.

Referring back to FIG. 3A, in operation 1130, values of a waveform of light to be modulated by the spatial light modulator 10 may be calculated by performing the second calculation by using the calculation results stored at the first and second memory addresses.

The second calculator 130 may perform the second calculation by using all of the first calculation results stored at the first and second memory addresses of the storage 120. The second calculation performed by the second calculator 130 may indicate an operation for calculating values of a waveform of light. For example, the second calculation may include an FFT operation. As another example, when a 3D image is displayed with dots, the second calculation may include an operation using a sum of PSFs. As another example, when a surface of a 3D image is displayed with a plurality of polyhedrons, the second calculation may include an angular spectrum operation.

The second calculator 130 may perform the second calculation of the calculation results stored at the first and second memory addresses in one single operation. By doing this, the second calculator 130 may calculate, in one single operation, values of a wavelength of light to be modulated by the spatial light modulator 10 to generate the image for the left eye and values of a wavelength of light to be modulated by the spatial light modulator 10 to generate the image for the right eye. That is, the second calculator 130 may calculate, in one single operation, values of a light modulation wavelength of the spatial light modulator 10 in order to generate the image for the left eye and values of a light modulation wavelength of the spatial light modulator 10 in order to generate the image for the right eye. Referring to FIG. 3B, the second calculator 130 may perform the second calculation corresponding to positions of the pupils of the left eye and the right eye of an observer in one operation by changing a memory address of the first storage space 120A from which data is read according to a position of a pupil of the observer. Therefore, a plurality of calculation operations of the second calculator 130 for the left eye and the right eye may be reduced to one single operation. Therefore, a calculation process of the second calculator 130 may be simplified, and a calculation time of the second calculator 130 may be reduced. In addition, hardware resources required for the second calculator 130 to perform the second calculation may be reduced.

The second calculator 130 may perform the second calculation such that an image window of the image for the left eye and an image window of the image for the right eye are spatially separated from each other within a viewing window. When the second calculator 130 transmits a result of the second calculation to the spatial light modulator 10, the spatial light modulator 10 may modulate reference light based on light waveform information provided by the second calculator 130. When the spatial light modulator 10 modulates the reference light, the observer 7 may view the hologram image on the hologram image display surface S1 as shown in FIG. 2.

Figure 5:
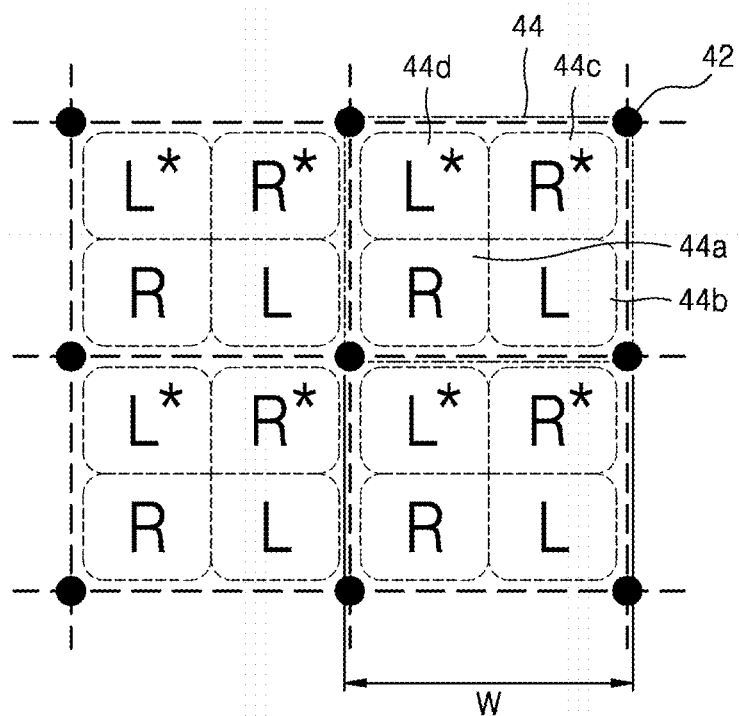
FIG. 5 illustrates a conceptual diagram for describing an image window of an image for the left eye and an image window of an image for the right eye that are spatially separated and displayed in a viewing window, according to an exemplary embodiment.

FIG. 5 illustrates a conceptual diagram for describing an image window of an image for the left eye and an image window of an image for the right eye that are spatially separated and displayed in a viewing window, according to an exemplary embodiment.

Referring to FIG. 5, a plurality of lattice spot noises 42 may appear on the hologram image display surface S1 shown in FIG. 2. Generally, the spatial light modulator 10 may include a plurality of pixel arrays for performing only any one of phase modulation and amplitude modulation. The plurality of pixel arrays may act as a lattice. Therefore, reference light is diffracted and interferes by not only the hologram pattern formed by the spatial light modulator 10 but also a pixel lattice including the pixel arrays of the spatial light modulator 10. In addition, a portion of the reference light may propagate through the spatial light modulator 10 without being diffracted by the diffraction pattern of the spatial light modulator 10. As a result, as shown in FIG. 5, the plurality of lattice spot noises 42 may appear on the hologram image display surface S1 from which a hologram image is viewable. The lattice spot noises 42 may act as image noise, thereby causing an image quality of a hologram image to be degraded and viewing of the hologram image to be uncomfortable.

A region having no lattice spot noises 42, which is surrounded by lattice spot noises 42, may be referred to as a viewing window 44. For example, a width W of the viewing window 44 may be proportional to the distance D between the spatial light modulator 10 and the hologram image display surface S1 from which the observer 7 views the hologram image 5 and to a wavelength $\lambda$ of light. In addition, the width W of the viewing window 44 may vary inversely with respect to a pixel pitch of the spatial light modulator 10. That is, a relationship $W=\lambda \times D/p$ may be established.

The second calculator 130 may perform the second calculation such that an image window 44a of the image for the right eye and an image window 44b of the image for the left eye are spatially separated from each other within the viewing window 44. Herein, the image window 44a of the image for the right eye indicates a region in which the image for the right eye is displayed as the hologram image 5 on the hologram image display surface S1. Therefore, when the right pupil of the observer 7 is located in the image window 44a of the image for the right eye, the right eye of the observer 7 may recognize the image for the right eye as the hologram image 5. Likewise, the image window 44b of the image for the left eye indicates a region in which the image for the left eye is displayed as the hologram image 5 on the hologram image display surface S1. Therefore, when the left pupil of the observer 7 is located in the image window 44b of the image for the left eye, the left eye of the observer 7 may recognize the image for the left eye as the hologram image 5.

The second calculator 130 may perform the second calculation such that position coordinates of the image window 44b of the image for the left eye, which is displayed in the viewing window 44, differ from position coordinates of the image window 44a of the image for the right eye, which is also displayed in the viewing window 44. That is, the second calculator 130 may perform the second calculation such that respective results of the second calculation with respect to the first and second memory addresses are represented on different coordinates in the viewing window 44. By causing the image window 44a of the image for the right eye and the image window 44b of the image for the left eye to be spatially separated from each other in operation 1130 in which the second calculator 130 performs the second calculation, the second calculator 130 may not additionally form a diffraction pattern for spatially separating the right eye and the left eye after the second calculation to move the image window 44a of the image for the right eye and the image window 44b of the image for the left eye. By omitting an operation of moving the image window 44a of the image for the right eye and the image window 44b of the image for the left eye, a processing speed of the hologram image 5 may increase.

The plurality of lattice spot noises 42 are generated by an internal structure of the spatial light modulator 10 and may be irrelevant to a hologram pattern. According to this principle, the second calculator 130 may calculate a waveform of light to be modulated by the spatial light modulator 10 such that the plurality of lattice spot noises 42 are not viewable by the observer 7 when the observer 7 views the image for the left eye and the image for the right eye. When the second calculator 130 perform the second calculation as described above, the image window 44a of the image for the right eye and the image window 44b of the image for the left eye may not overlap the lattice spot noises 42, and may be located in the viewing window 44. This hologram image processing scheme is commonly referred to as an off-axis scheme. Since the second calculator 130 performs the second calculation with respect to the first and second memory addresses such that the off-axis scheme is implemented, a calculator using a separate diffraction pattern for moving the image window 44a of the image for the right eye and the image window 44b of the image for the left eye need not be added to implement the off-axis scheme. Therefore, a hologram image processing speed may increase.

Since the values of the light waveform calculated by the second calculator 130 are represented as a complex number, complex conjugate noise images of the image for the left eye and the image for the right eye may appear. A region 44d in which the complex conjugate noise image of the image for the left eye appears may be located at a symmetrical position with respect to the image window 44b of the image for the left eye based on the lattice spot noise 42. In addition, a region 44c in which the complex conjugate noise image of the image for the right eye appears may be located at a symmetrical position with respect to the image window 44a of the image for the right eye based on the lattice spot noise 42. The second calculator 130 may set positions of the image window 44a of the image for the right eye and the image window 44b of the image for the left eye such that the image windows 44a and 44b of the image for the right eye and the image for the left eye are spatially separated from the regions 44c and 44d in which the complex conjugate noise images appear. In this manner, the observer 7 may view an image from which noise images have been removed.

As shown in FIG. 5, since the regions 44c and 44d in which the complex conjugate noise images appear are included in the viewing window 44, sizes of the image windows 44a and 44b of the image for the right eye and the image for the left eye may be smaller than a size of the viewing window 44. The above-described sizes of the image windows 44a and 44b of the image for the right eye and the image for the left eye may be related to a resolution recognized by the observer 7 when the image for the left eye and the image for the right eye are reproduced as the hologram image 5.

For example, when the size of the image window 44a of the image for the right eye increases, a spatial frequency band of a hologram image indicating the image for the right eye may also increase. Likewise, when the size of the image window 44b of the image for the left eye increases, a spatial frequency band of a hologram image indicating the image for the left eye may also increase. The wider a spatial frequency band is, the higher resolution a hologram image to be reproduced has. Conversely, the narrower a spatial frequency band is, the lower resolution a hologram image to be reproduced has.

Even though resolutions of the image for the left eye and the image for the right eye in the input image data are relatively high, when the image for the left eye and the image for the right eye are actually reproduced as the hologram image 5, the resolution of the hologram image 5 may be limited to the sizes of the image windows 44a and 44b of the image for the right eye and the image for the left eye. Accordingly, when the resolutions of the image for the left eye and the image for the right eye are higher than resolutions reproducible through the image windows 44a and 44b, operation 1110 in which the first calculator 110 performs the first calculation may be inefficiently complicated.

To improve the problem described above, an apparatus and method for processing a holographic image, according to another exemplary embodiment, may adjust the respective resolutions of the image for the left eye and the image for the right eye.

Figure 6:
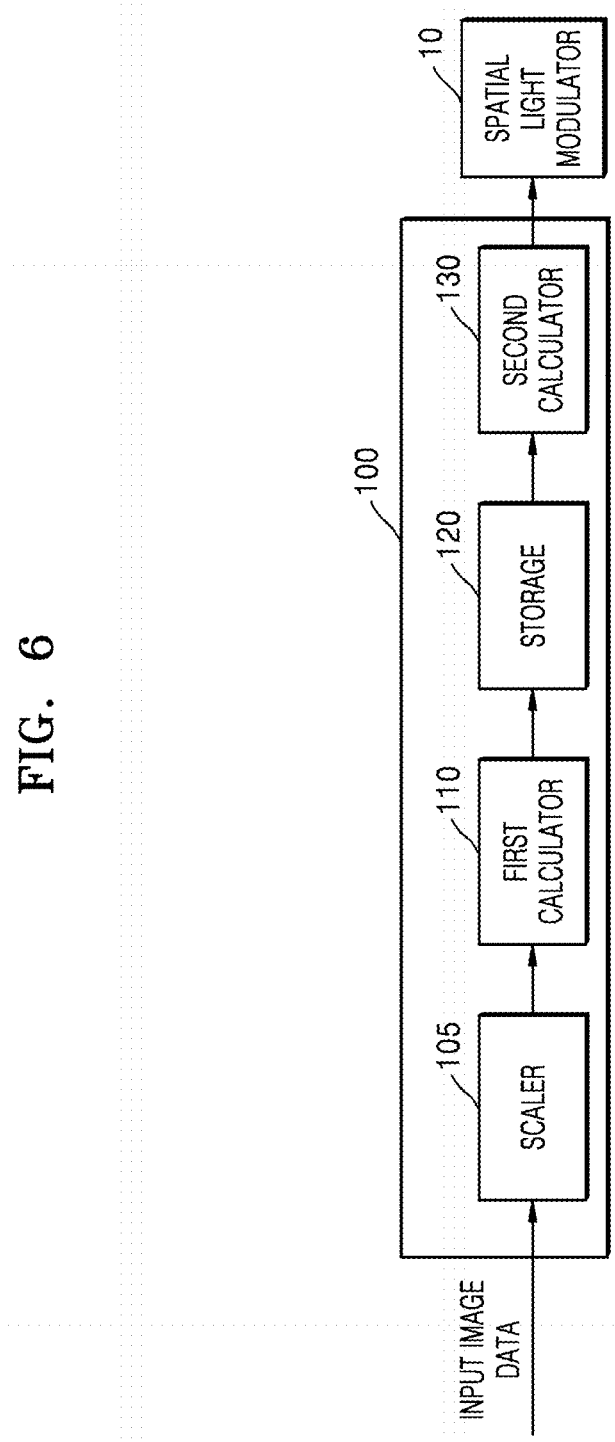
FIG. 6 illustrates a block diagram of an apparatus for processing a holographic image, according to another exemplary embodiment.
Figure 7:
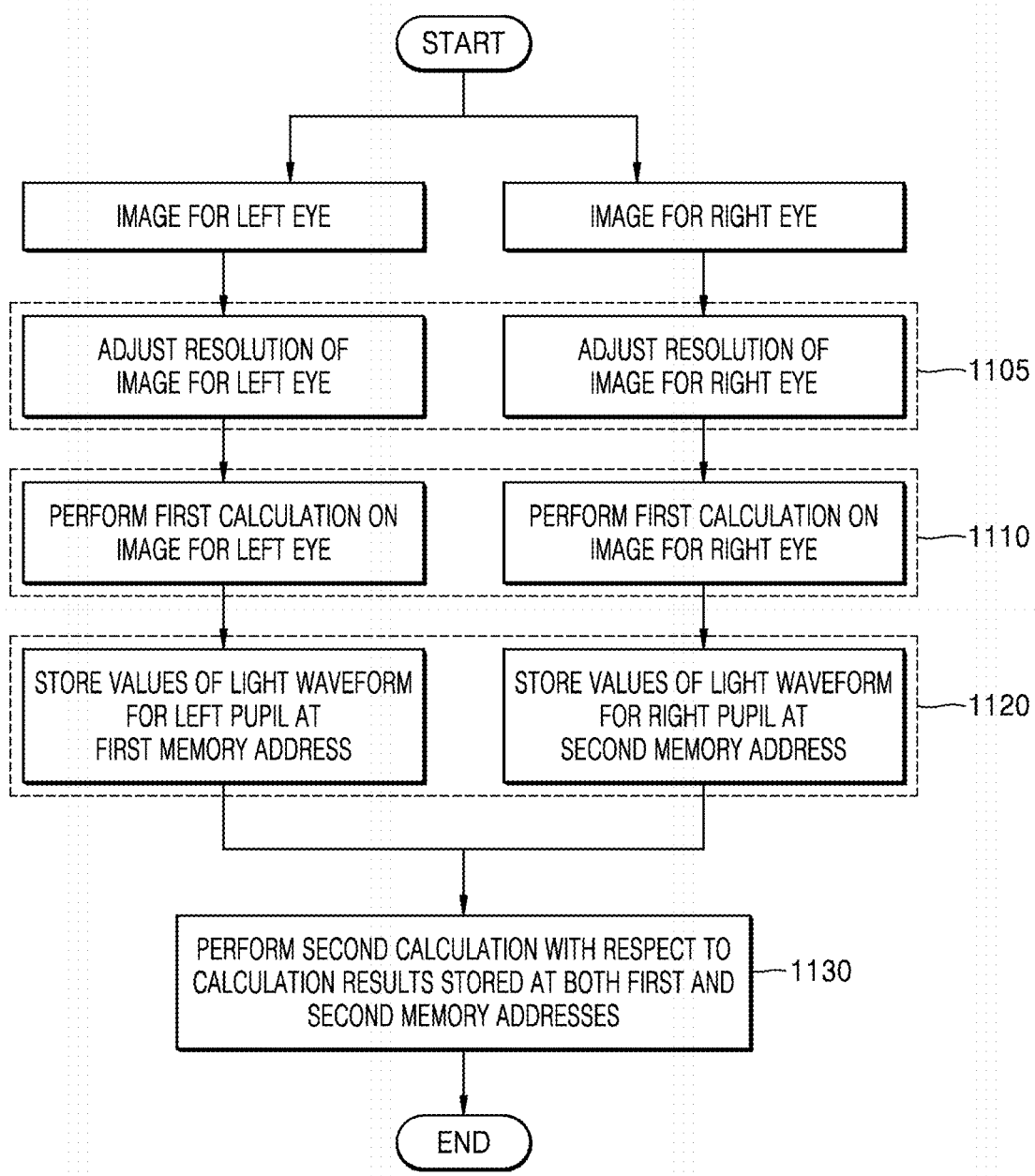
FIG. 7 illustrates a flowchart of a method used by the apparatus of FIG. 6 to process a holographic image, according to another exemplary embodiment.

FIG. 6 illustrates a block diagram of the apparatus 100 for processing a holographic image, according to another exemplary embodiment. In addition, FIG. 7 illustrates a flowchart of a method used by the apparatus 100 of FIG. 6 to process a holographic image, according to another exemplary embodiment. When the exemplary embodiments shown in FIGS. 6 and 7 are described, the same description as described above is omitted.

Referring to FIGS. 6 and 7, the apparatus 100 according to the present exemplary embodiment may further include a scaler 105. The scaler 105 may adjust respective resolutions of an image for the left eye and an image for the right eye in operation 1105. The scaler 105 may adjust the resolutions of the image for the left eye and the image for the right eye based on the respective sizes of the image window 44b of the image for the left eye and the image window 44a of the image for the right eye. For example, the scaler 105 may change the resolution of the image for the left eye to a resolution that is less than or equal to a resolution which is representable in the image window 44b of the image for the left eye. In addition, the scaler 105 may change the resolution of the image for the right eye to a resolution that is less than or equal to a resolution which is representable in the image window 44a of the image for the right eye.

As shown in FIG. 5, each of the size of the image window 44b of the image for the left eye and the size of the image window 44a of the image for the right eye may be less than or equal to ¼ the size of the viewing window 44 due to complex conjugate noise images. Therefore, for example, the scaler 105 may change the respective resolutions of the image for the left eye and the image for the right eye to resolutions that are less than or equal to a resolution which is representable in the image window 44a or 44b having a size that is approximately ¼ the size of the viewing window 44. When the scaler 105 changes the respective resolutions of the image for the left eye and the image for the right eye, a first calculation process of the first calculator 110 in operation 1110 may be simplified.

Figure 8:
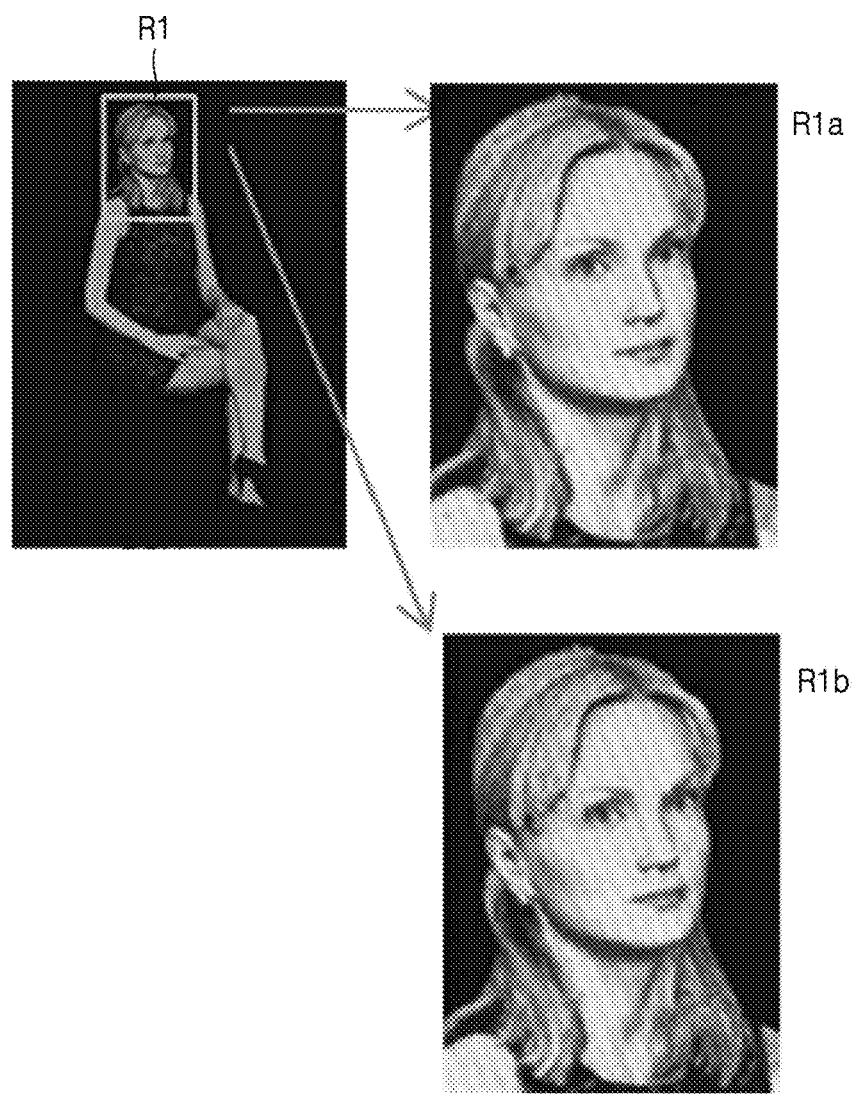
FIG. 8 illustrates a case wherein a scaler changes resolutions of an image for the left eye and an image for the right eye and resolutions recognized by an observer from the image for the left eye and the image for the right eye.

FIG. 8 illustrates a case wherein the scaler 105 changes respective resolutions of an image for the left eye and an image for the right eye, and a resolution of a hologram image recognized by the observer 7.

FIG. 8 shows a hologram image in which a person appears, wherein comparative examples R1a and R1b on how a face part R1 of the person, which is most affected by resolution, is reproduced are shown. R1a denotes a hologram image recognized by the observer 7 when the scaler 105 has not changed the resolutions of the image for the left eye and the image for the right eye, and R1b denotes a hologram image recognized by the observer 7 when the scaler 105 has changed the resolutions of the image for the left eye and the image for the right eye.

Referring to FIG. 8, the resolution recognized by the observer 7 in the case R1b where the scaler 105 has changed the resolutions of the image for the left eye and the image for the right eye is almost the same as the resolution recognized by the observer 7 in the case R1a where the scaler 105 has not changed the resolutions of the image for the left eye and the image for the right eye. That is, even when the he scaler 105 changes the respective resolutions of the image for the left eye and the image for the right eye based on the respective sizes of the image windows 44a and 44b, the resolution of the hologram image viewed by the observer 7 may not be affected. Therefore, the scaler 105 may change the respective resolutions of the image for the left eye and the image for the right eye based on the respective sizes of the image windows 44a and 44b in order to reduce the first calculation process of the first calculator 110 without affecting the resolution of the hologram image recognized by the observer 7.

FIG. 5 shows that each of the size of the image window 44b of the image for the left eye and the size of the image window 44a of the image for the right eye is about ¼ the size of the viewing window 44. However, according to circumstances, each of the size of the image window 44b of the image for the left eye and the size of the image window 44a of the image for the right eye may vary according to input image data. For example, when an object indicated by input image data is simply representable, each of the size of the image window 44b of the image for the left eye and the size of the image window 44a of the image for the right eye may be less than ¼ the size of the viewing window 44.

Figure 9:
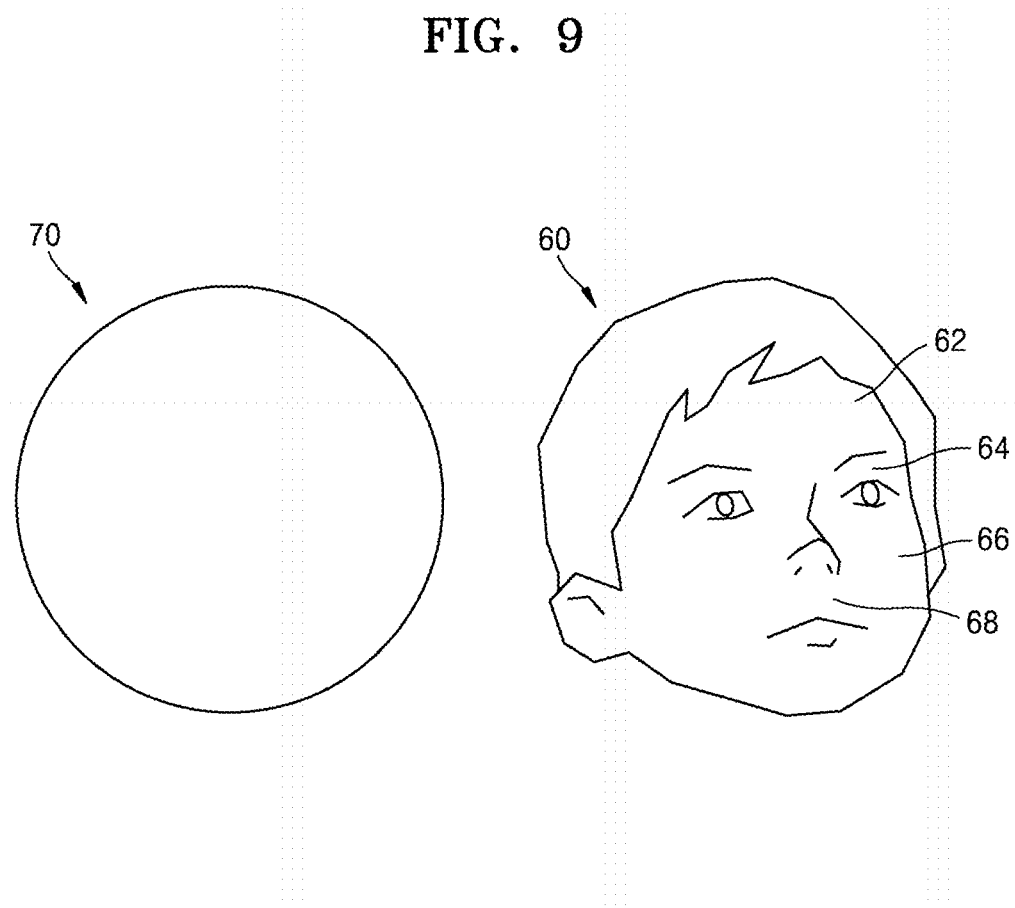
FIG. 9 illustrates objects indicated by two different input image data sets.

FIG. 9 illustrates objects 70 and 60 indicated by two different (first and second) input image data sets.

Referring to FIG. 9, the object 70 indicated by the first input image data set has a shape of a sphere of which the surface may also be represented to be smooth. However, the object 60 indicated by the second input image data set has a shape of a face of person of which a forehead 62, eyebrows 64, cheeks 66, a philtrum 68, and the like may be represented as being relatively complicated. Therefore, the observer 7 may not be uncomfortable to view a hologram image when a resolution of the object 60 indicated by the second input image data set is relatively high. However, even when a resolution of the object 70 indicated by the first input image data set is low, the observer 7 may rarely be uncomfortable to view a hologram image. Since the resolution of a reproduced hologram image depends on the sizes of the image windows 44a and 44b, the sizes of the image windows 44a and 44b of the image for the right eye and the image for the left eye may vary according to a complexity of an image indicated by corresponding input image data. The scaler 105 may change the respective resolutions of the image for the right eye and the image for the left eye based on the sizes of the image windows 44a and 44b of the image for the right eye and the image for the left eye, which have been determined according to the complexity of the image.

Figure 10:
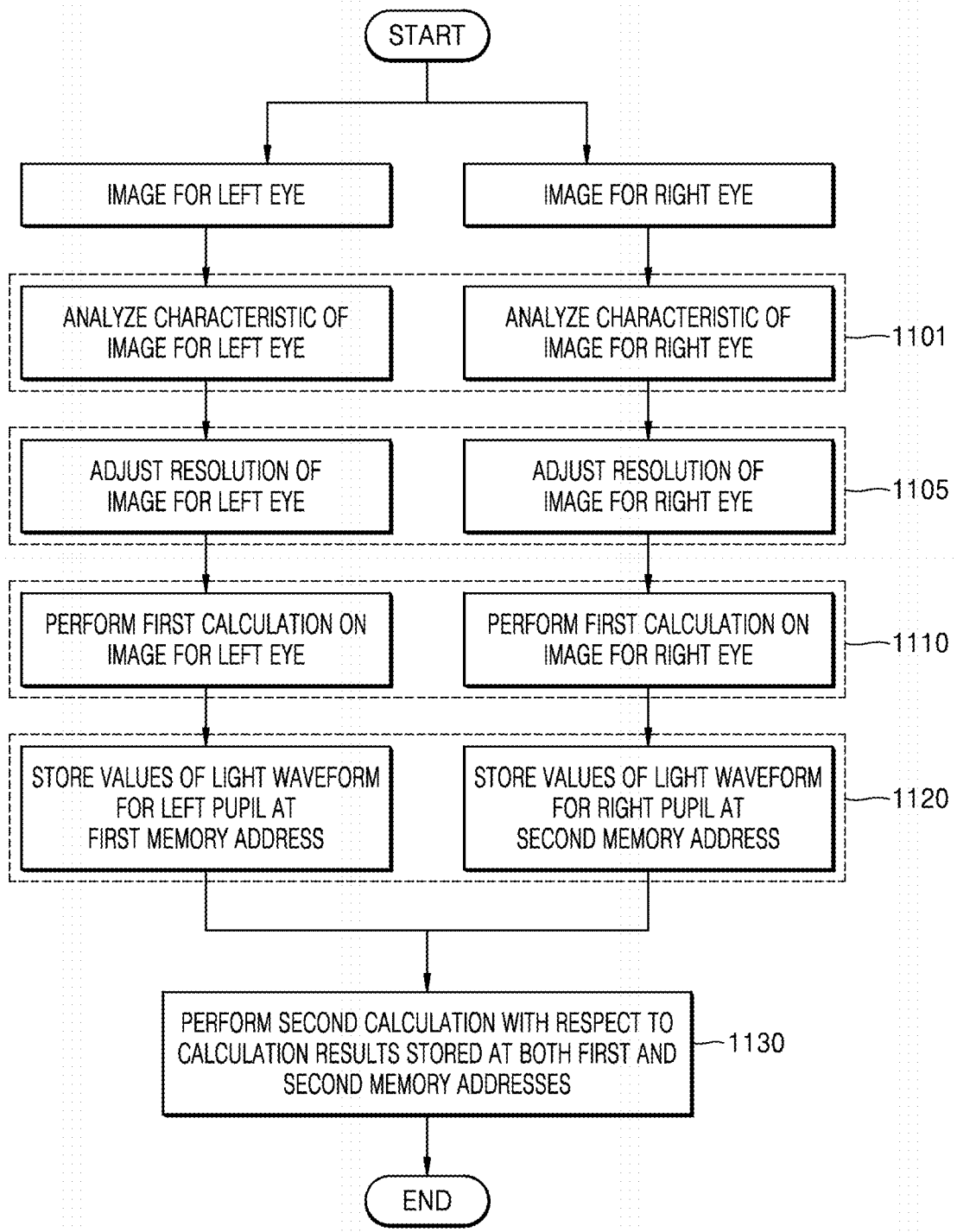
FIG. 10 illustrates a flowchart of a method for processing a holographic image, according to another exemplary embodiment.

FIG. 10 illustrates a flowchart of a method for processing a holographic image, according to another exemplary embodiment. When the exemplary embodiment shown in FIG. 10 is described, the same description as described above is omitted.

Referring to FIG. 10, in operation 1101, the scaler 105 may analyze respective characteristics of each of an image for the left eye and an image for the right eye. Herein, the characteristics of the image for the left eye and the characteristics of the image for the right eye may include information that relates to how much an outer appearance and the like of an object appearing in each of the image for the left eye and the image for the right eye are complicated. In operation 1105, the scaler 105 may change respective resolutions of the image for the left eye and the image for the right eye based on the characteristic of the image for the left eye and the characteristic of the image for the right eye. In this case, the scaler 105 may change the respective resolutions of the image for the left eye and the image for the right eye by taking into account sizes of the image windows 44a and 44b required to represent the image for the right eye and the image for the left eye according to the characteristics of the image for the right eye and the characteristics of the image for the left eye, respectively.

Figure 11:
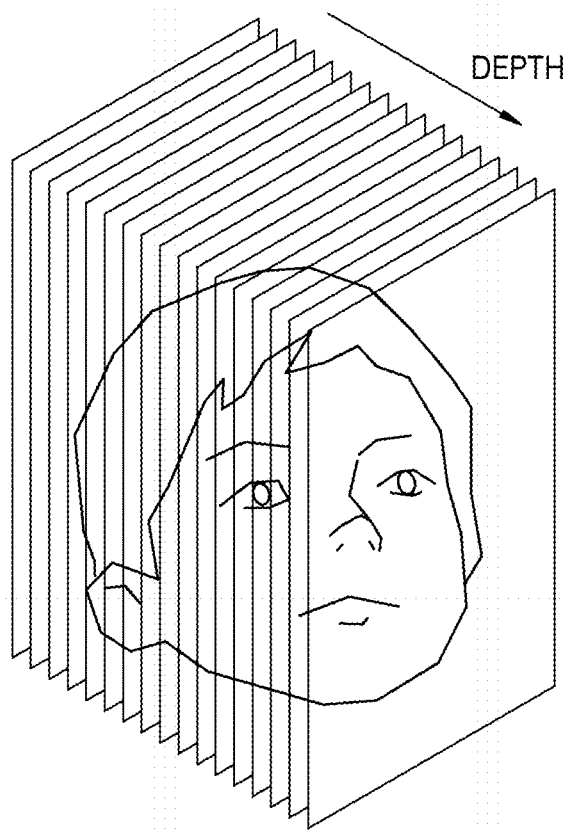
FIG. 11 illustrates an object indicated by input image data according to depth.

When the scaler 105 changes the respective resolutions of the image for the left eye and the image for the right eye, the scaler 105 may change the resolutions so as to vary by depth. FIG. 11 illustrates an object indicated by input image data according to depth.

Referring to FIG. 11, an image characteristic of an object, which is indicated by input image data, may vary for each depth. The image characteristic may include complexity and the like by which the object is represented. In addition, a degree of recognition of the object by the observer 7 may vary for each depth. For example, since a recognition capability of the observer 7 decreases in a region of a shallow depth, even when a hologram image is realized with a low resolution, the observer 7 may view the hologram image without feeling uncomfortable. Therefore, the scaler 105 may variably change resolutions of the image for the left eye and the image for the right eye according to depths when changing the image for the left eye and the image for the right eye.

Figure 12:
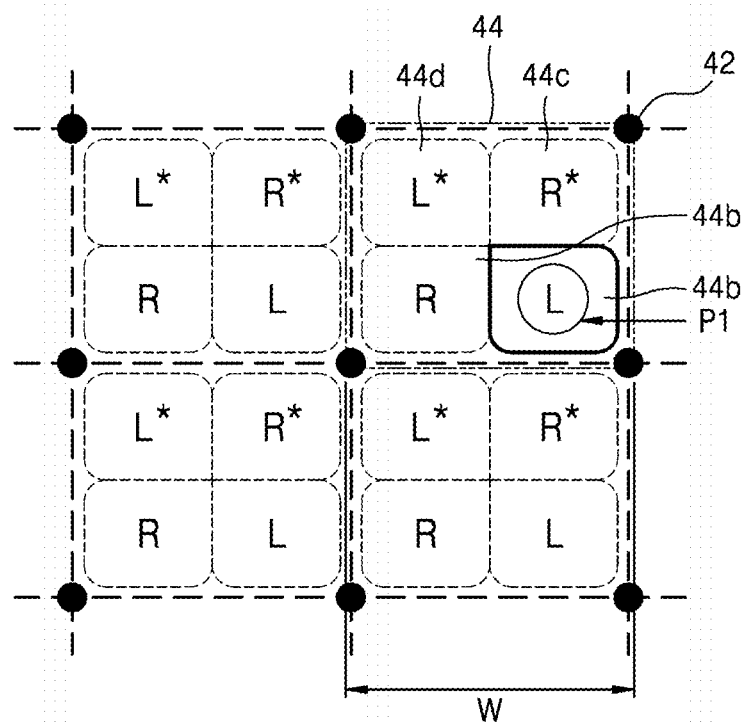
FIG. 12 illustrates a hologram image display surface including a viewing window and a region in which a pupil of an observer is located.

When changing the image for the left eye and the image for the right eye, the scaler 105 may further take into account a size of a pupil of the observer 7. FIG. 12 illustrates the hologram image display surface S1 including the viewing window 44 and a region P1 in which a pupil of the observer 7 is located.

Referring to FIG. 12, a size of the region P1 in which a pupil of the observer 7 is located in the viewing window 44 may be less than ¼ the size of the viewing window 44. In this case, even when the sizes of the image windows 44a and 44b of the image for the right eye and the image for the left eye are greater than the size of the pupil of the observer 7, the resolution of a hologram image recognized by the observer 7 may not be affected. Since only light having an incident area as wide as the size of the pupil of the observer 7 is actually incident to the pupil of the observer 7, even when the image windows 44a and 44b are realized so as to have a wider area than the size of the pupil, the observer 7 cannot recognize light in the remaining region except for the region P1 in which the pupil of the observer 7 is located. Therefore, the scaler 105 may change the resolutions of the image for the left eye and the image for the right eye to resolutions that are less than or equal to a resolution which is representable in an image window having the pupil size P1 of the observer 7.

Figure 13:
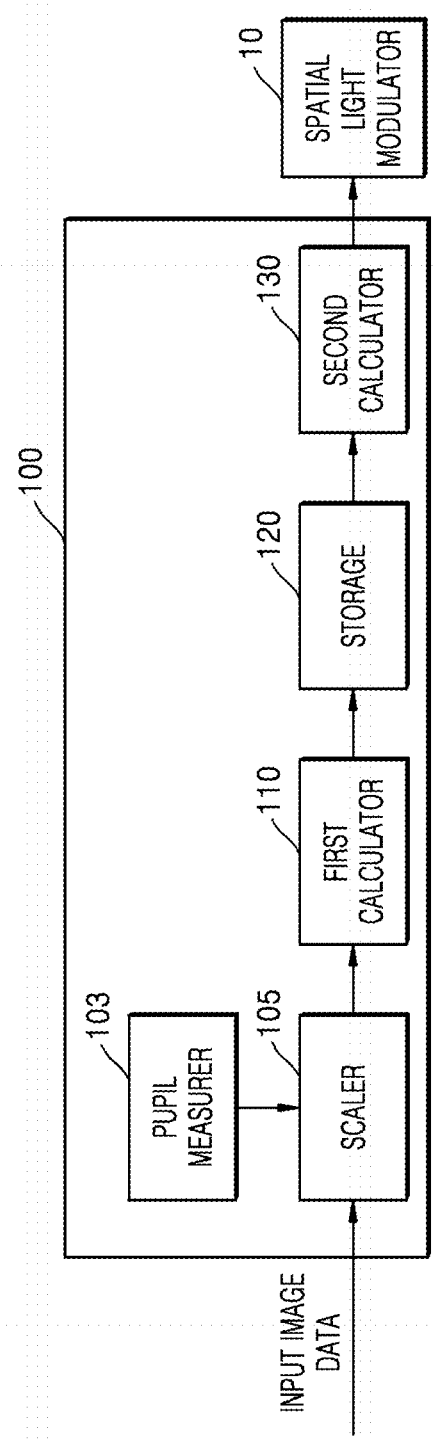
FIG. 13 illustrates a block diagram of an apparatus for processing a holographic image, according to another exemplary embodiment.
Figure 14:
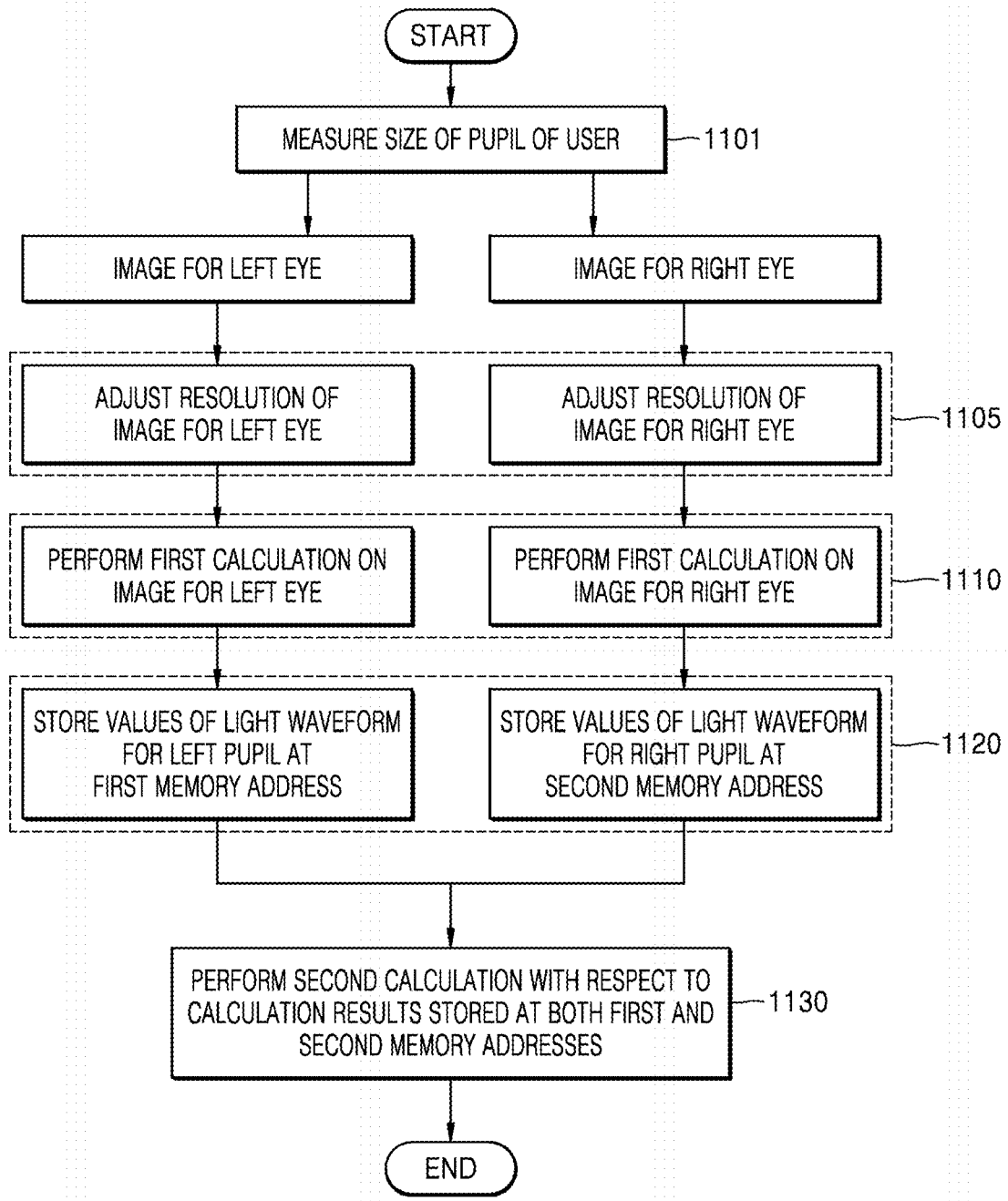
FIG. 14 illustrates a flowchart of a method used by the apparatus of FIG. 13 to process a holographic image, according to another exemplary embodiment.

FIG. 13 illustrates a block diagram of an apparatus 100 for processing a holographic image, according to another exemplary embodiment. In addition, FIG. 14 illustrates a flowchart of a method used by the apparatus 100 of FIG. 13 to process a holographic image, according to another exemplary embodiment. When the exemplary embodiments shown in FIGS. 13 and 14 are described, the same description as described above is omitted.

Referring to FIG. 13, the apparatus 100 according to the present exemplary embodiment may include a pupil measurer 103 configured to measure a pupil size of the observer 7. The pupil measurer 103 may measure the pupil size by photographing a pupil of the observer 7 in operation 1101. For example, the pupil measurer 103 may measure sizes of both the left pupil and the right pupil of the observer 7. As another example, the pupil measurer 103 may measure the size of only any one of the left pupil and the right pupil of the observer 7. When the pupil measurer 103 measures the size of only any one of the left pupil and the right pupil of the observer 7, the size of the other one may be assumed to be similar to the measured size.

Each of the size of the image window 44b of the image for the left eye and the size of the image window 44a of the image for the right eye may be determined according to the pupil size measured by the pupil measurer 103. In addition, the scaler 105 may change the resolutions of the image for the left eye and the image for the right eye based on the sizes of the image windows 44a and 44b, which are determined according to the pupil size.

The exemplary embodiments described above are based on a case where information about an image for the left eye and an image for the right eye is included in input image data. However, input image data may include only information about a 3D object to be reproduced as a hologram image, and may not separately include information about an image for the left eye and an image for the right eye. In this case, the apparatus 100 may extract each of an image for the left eye and an image for the right eye from input image data.

Figure 15:
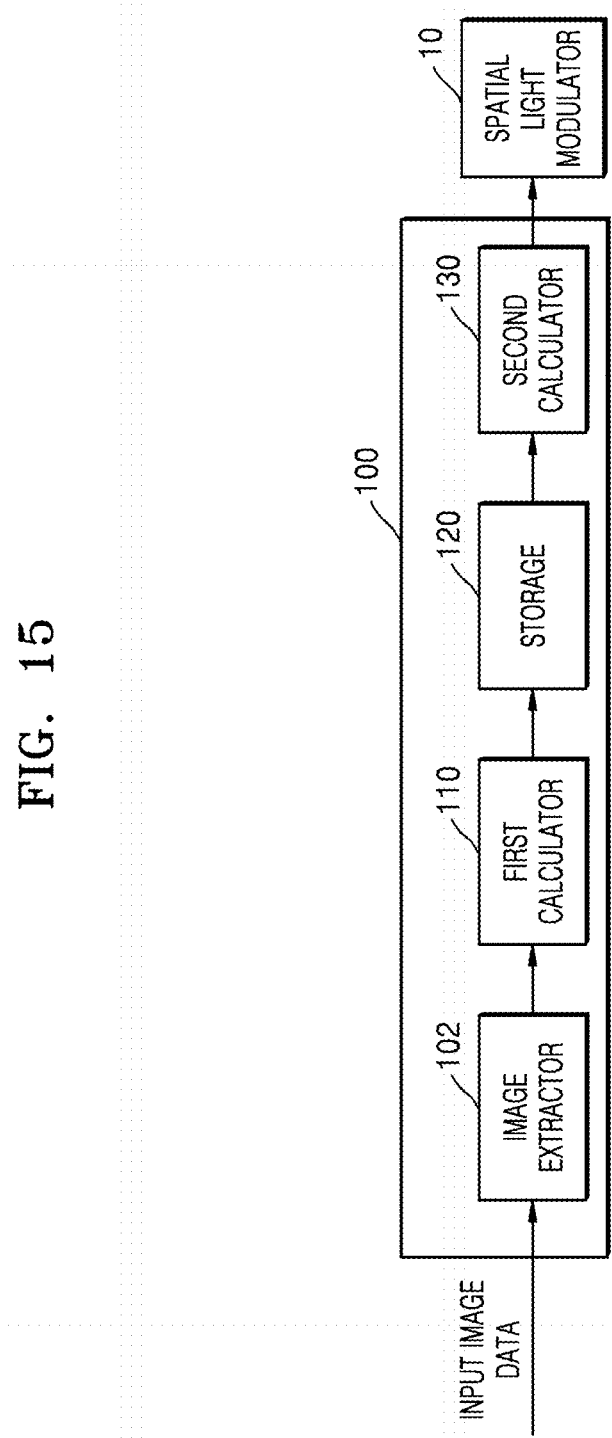
FIG. 15 illustrates a block diagram of an apparatus for processing a holographic image, according to another exemplary embodiment.
Figure 16:
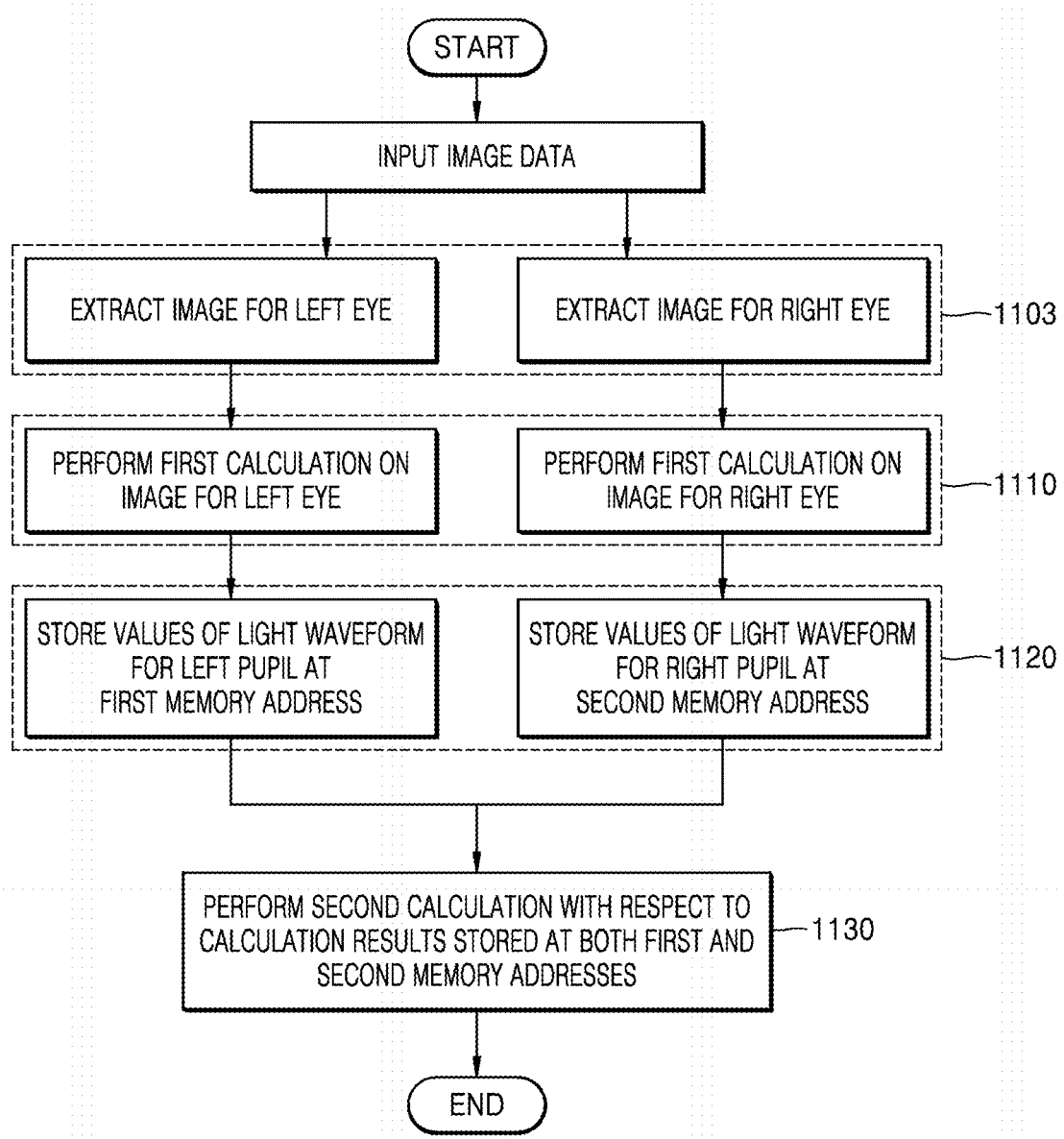
FIG. 16 illustrates a flowchart of a method used by the apparatus of FIG. 15 to process a holographic image, according to another exemplary embodiment.

FIG. 15 illustrates a block diagram of the apparatus 100 for processing a holographic image, according to another exemplary embodiment. In addition, FIG. 16 illustrates a flowchart of a method used by the apparatus 100 of FIG. 15 to process a holographic image, according to another exemplary embodiment. When the exemplary embodiments shown in FIGS. 15 and 16 are described, the same description as described above is omitted.

Referring to FIGS. 15 and 16, the apparatus 100 according to the present exemplary embodiment may further include an image extractor 102. The image extractor 102 may extract each of an image for the left eye and an image for the right eye from input image data in operation 1103. When extracting the image for the left eye and the image for the right eye, the image extractor 102 may extract the image for the left eye and the image for the right eye to be different from each other by taking into account parallax and the like, thereby causing the observer 7 to feel a cubic effect from a hologram image. Alternatively, the image extractor 102 may extract the image for the left eye and the image for the right eye as the same images.

In operation 1103, when the image extractor 102 extracts the image for the left eye and the image for the right eye, the image extractor 102 may adjust respective resolutions of the image for the left eye and the image for the right eye. As a scheme by which the image extractor 102 changes the resolutions of the image for the left eye and the image for the right eye, the above-described scheme by which the scaler 105 changes the resolutions of the image for the left eye and the image for the right eye may be applied.

For example, the image extractor 102 may adjust respective resolutions of the image for the left eye and the image for the right eye based on the size of the image window 44b of the image for the left eye and the size of the image window 44a of the image for the right eye. In addition, the image extractor 102 may extract the image for the left eye and the image for the right eye, which have resolutions that are less than or equal to a resolution which is representable in the image window 44a or 44b having a size that is about ¼ the size of the viewing window 44.

In addition, the image extractor 102 may analyze characteristics of the image for the left eye and characteristics of the image for the right eye. Herein, the characteristics of the image for the left eye and the characteristics of the image for the right eye may include information that relates to how much an outer appearance and the like of an object appearing in each of the image for the left eye and the image for the right eye are complicated. The image extractor 102 may extract the image for the left eye and the image for the right eye, which have respective resolutions determined based on the characteristic of the image for the left eye and the characteristic of the image for the right eye. In this case, the image extractor 102 may determine the respective resolutions of the image for the left eye and the image for the right eye by taking into account the sizes of the image windows 44a and 44b required to represent the image for the right eye and the image for the left eye according to the characteristics of the image for the right eye and the characteristics of the image for the left eye, respectively.

The image extractor 102 may variably adjust the resolutions of the image for the left eye and the image for the right eye according to respective depths of the image for the left eye and the image for the right eye.

The apparatus 100 of FIG. 15 may further include the pupil measurer 103 described with reference to FIG. 13. In this case, the image extractor 102 may extract each of the image for the left eye and the image for the right eye, which have respective resolutions based on the sizes of the image windows 44a and 44b determined according to the pupil size.

The apparatus and method for processing a holographic image have been described above according to the exemplary embodiments. According to the exemplary embodiments, when the second calculator 130 performs the second calculation, the second calculator 130 may generate a hologram image without forming a diffraction pattern that would cause the image windows 44a and 44b to move by generating the image window 44b of the image for the left eye and the image window 44a of the image for the right eye, the two images being spatially separated in the viewing window 44. In addition, a hologram image may be reproduced via the off-axis scheme even without separately forming a diffraction pattern to adjust positions of the image windows 44a and 44b. Accordingly, a computational amount in the method of processing a hologram image may be reduced.

An apparatus according to the present exemplary embodiments may include a processor, a memory for storing and executing program data, a permanent storage such as a disk drive, a communication port for performing communication with an external device, and a user interface, such as a touch panel, a key, and a button. Methods implemented via a software module or an algorithm may be stored in a non-transitory computer-readable recording medium in the form of computer-readable codes or program instructions which are executable in the processor. Examples of the non-transitory computer-readable recording medium include magnetic storage media (e.g., read-only memory (ROM), random access memory (RAM), floppy disks, hard disks, etc.) and optical recording media (e.g., compact disc ROMs (CD-ROMs), Digital Versatile Discs (DVDs), etc.). The non-transitory computer-readable recording medium can also be distributed over network coupled computer systems so that the computer-readable code is stored and executed in a distributed fashion. The media can be read by a computer, stored in the memory, and executed by the processor.

The present exemplary embodiments can be represented with functional blocks and various processing steps. These functional blocks can be implemented by various numbers of hardware and/or software configurations for executing specific functions. For example, the present exemplary embodiments may adopt direct circuit configurations, such as memory, processing, logic, and look-up table, for executing various functions under control of one or more processors or by other control devices. Like components of the present exemplary embodiments being able to execute the various functions with software programming or software elements, the present exemplary embodiments can be implemented by a programming or scripting language, such as C, C++, Java, or assembler, with various algorithms implemented by a combination of a data structure, processes, routines, and/or other programming components. Functional aspects can be implemented with algorithms executed in one or more processors. In addition, the present exemplary embodiments may adopt conventional systems for electronic environment setup, signal processing and/or data processing. The terms, such as "mechanism", "element", "means", and "configuration", can be widely used and are not delimited as mechanical and physical configurations. The terms may include the meaning of a series of routines of software in association with a processor.

Specific executions described in the present exemplary embodiments are illustrative and do not limit the technical scope even in any method. For conciseness of the specification, disclosure of conventional electronic configurations, control systems, software, and other functional aspects of the systems may be omitted. In addition, connections or connection members of lines between components shown in the drawings illustrate functional connections and/or physical or circuit connections, and the connections or connection members can be represented by replaceable or additional various functional connections, physical connections, or circuit connections in an actual apparatus.

The use of the term "the" or a similar term in the specification (in particular, in the claims) may correspond to both the singular and the plural. Finally, regarding the steps of the methods, if an order is not clearly disclosed or if there is no disclosure contrary to a clear order, the steps can be performed in any order deemed proper. The methods are not necessarily limited to the disclosed orders of the steps. The use of all illustrations or illustrative terms (for example, and, so forth, etc.) is simply to describe the technical ideas in detail, and the scope of the technical ideas is not limited by the illustrations or illustrative terms unless the illustrations or illustrative terms are limited by claims. In addition, it will be understood by those of ordinary skill in the art that various modifications, combinations, and changes can be formed according to design conditions and factors within the scope of the attached claims or the equivalents.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. An apparatus for processing a holographic image, the apparatus comprising:
    a scaler configured to change a first resolution of the image for a left eye included in input image data based on a size of an image window of an image for the left eye and a second resolution of an image for a right eye included in the input image data based on a size of an image window of an image for the right eye;
    a first calculator configured to calculate values of a light waveform for a left pupil and values of a light waveform for a right pupil by performing a first calculation that relates to each of the image for the left eye and the image for the right eye that are changed by the scaler, respectively;
    a storage configured to store the calculated values of the light waveform for the left pupil at a first memory address and to store the calculated values of the light waveform for the right pupil at a second memory address that is different from the first memory address;
    a second calculator configured to calculate values of a waveform of light to be modulated by a spatial light modulator by performing a second calculation that uses the calculated values stored at the first and second memory addresses such that the image window of the image for the left eye is spatially separated from the image window of the image for the right eye within a viewing window,
    wherein the viewing window is a region on a hologram image display surface on which the holographic image is displayed, the region having no lattice spot noises and being surrounded by the lattice spot noises, wherein the lattice spot noises are noises generated on the hologram image display surface by pixel arrays of the spatial light modulator, wherein the image window of the image for the left eye is a region in which the image for the left eye is displayed within the viewing window on the hologram image display surface, and wherein the image window of the image for the right eye is a region in which the image for the right eye is displayed within the viewing window on the hologram image display surface.

2. The apparatus of claim 1, wherein the second calculator is further configured to perform the second calculation that uses the calculated values stored at the first and second memory addresses in a single operation.

3. The apparatus of claim 1, wherein each of the size of the image window of the image for the left eye and the size of the image window of the image for the right eye is less than or equal to ¼ a size of the viewing window.

4. The apparatus of claim 1, further comprising a pupil measurer configured to measure a size of at least one from among the left pupil and the right pupil, wherein each of the size of the image window of the image for the left eye and the size of the image window of the image for the right eye is determined according to the measured size of the at least one pupil.

5. The apparatus of claim 1, wherein the scaler is further configured to variably adjust each of the first resolution of the image for the left eye and the second resolution of the image for the right eye according to respective depths of the image for the left eye and the image for the right eye.

6. The apparatus of claim 1, further comprising an image extractor configured to extract each of the image for the left eye and the image for the right eye from the input image data.

7. The apparatus of claim 6, wherein the image extractor is further configured to adjust the first resolution of the image for the left eye based on the size of the image window of the image for the left eye, and to adjust the second resolution of the image for the right eye based on the size of the image window of the image for the right eye.

8. The apparatus of claim 7, wherein each of the size of the image window of the image for the left eye and the size of the image window of the image for the right eye is less than or equal to ¼ a size of the viewing window.

9. The apparatus of claim 7, wherein each of the size of the image window of the image for the left eye and the size of the image window of the image for the right eye is determined according to an image complexity of the input image data.

10. The apparatus of claim 7, further comprising a pupil measurer configured to measure a size of at least one from among the left pupil and the right pupil, wherein each of the size of the image window of the image for the left eye and the size of the image window of the image for the right eye is determined according to the measured size of the at least one pupil.

11. The apparatus of claim 6, wherein the image extractor is further configured to variably adjust each of the first resolution of the image for the left eye and the second resolution of the image for the right eye according to respective depths of the image for the left eye and the image for the right eye.

12. The apparatus of claim 1, wherein the second calculator is further configured to perform the second calculation such that each of the image window of the image for the left eye and the image window of the image for the right eye is spatially separated from a display region of a noise image.

13. The apparatus of claim 12, wherein the noise image includes a lattice spot noise image and at least one complex conjugate noise image of each of the image for the left eye and the image for the right eye.

14. A method for processing a holographic image, the method comprising:

changing a first resolution of an image for a left eye included in input image data based on a size of an image window of the image for the left eye and changing a second resolution of an image for a right eye included in the input image data based on a size of an image window of the image for the right eye;

calculating values of a light waveform for a left pupil and values of a light waveform for a right pupil by performing a first calculation that relates to each of the image for the left eye and the image for the right eye;

storing the calculated values of the light waveform for the left pupil at a first memory address and storing the calculated values of the light waveform for the right pupil at a second memory address that is different from the first memory address; and calculating values of a waveform of light to be modulated by a spatial light modulator by performing a second calculation that uses the calculated values stored at the first and second memory addresses, wherein the calculating the values of the waveform of light to be modulated by the spatial light modulator comprises performing the second calculation such that the image window of the image for the left eye is spatially separated from the image window of the image for the right eye within a viewing window, wherein the viewing window is a region on a hologram image display surface on which the holographic image is displayed, the region having no lattice spot noises and being surrounded by the lattice spot noises, wherein the lattice spot noises are noises generated on the hologram image display surface by pixel arrays of the spatial light modulator, wherein the image window of the image for the left eye is a region in which the image for the left eye is displayed within the viewing window on the hologram image display surface, and wherein the image window of the image for the right eye is a region in which the image for the right eye is displayed within the viewing window on the hologram image display surface.

15. The method of claim 14, wherein the performing the second calculation comprises performing the second calculation that uses the calculated values stored at the first and second memory addresses in a single operation.

16. The method of claim 14, wherein each of the size of the image window of the image for the left eye and the size of the image window of the image for the right eye is less than or equal to ¼ a size of the viewing window.

17. The method of claim 14, further comprising measuring a size of at least one from among the left pupil and the right pupil by using a pupil measurer, wherein each of the size of the image window of the image for the left eye and the size of the image window of the image for the right eye is determined according to the measured size of the at least one pupil.

18. The method of claim 14, wherein the changing the first resolution and the second resolution comprises variably adjusting each of the first resolution of the image for the left eye and the second resolution of the image for the right eye according to respective depths of the image for the left eye and the image for the right eye.

19. The method of claim 14, further comprising extracting each of the image for the left eye and the image for the right eye from the input image data.

20. The method of claim 19, wherein the extracting the image for the left eye and the image for the right eye comprises adjusting the first resolution of the image for the left eye based on the size of the image window of the image for the left eye and adjusting the second resolution of the image for the right eye based on the size of the image window of the image for the right eye.

21. The method of claim 20, wherein each of the size of the image window of the image for the left eye and the size of the image window of the image for the right eye is less than or equal to ¼ a size of the viewing window.

22. The method of claim 20, wherein each of the size of the image window of the image for the left eye and the size of the image window of the image for the right eye is determined according to an image complexity of the input image data.

23. The method of claim 20, further comprising measuring a size of at least one from among the left pupil and the right pupil by using a pupil measurer, wherein each of the size of the image window of the image for the left eye and the size of the image window of the image for the right eye is determined according to the measured size of the at least one pupil.

24. The method of claim 20, wherein the extracting the image for the left eye and the image for the right eye comprises adjusting each of the first resolution of the image for the left eye and the second resolution of the image for the right eye according to respective depths of the image for the left eye and the image for the right eye.

25. The method of claim 14, wherein the calculating the values of the waveform of light to be modulated by the spatial light modulator comprises performing the second calculation such that each of the image window of the image for the left eye and the image window of the image for the right eye is spatially separated from a display region of a noise image.

26. The method of claim 25, wherein the noise image includes a lattice spot noise image and at least one complex conjugate noise image of each of the image for the left eye and the image for the right eye.

* * * * *